United States Patent
Tanno et al.

(10) Patent No.: US 8,387,670 B2
(45) Date of Patent: Mar. 5, 2013

(54) TIRE NOISE REDUCTION DEVICE AND PNEUMATIC TIRE

(75) Inventors: Atsushi Tanno, Hiratsuka (JP); Hiroyuki Tsujimoto, Asakuchi (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 487 days.

(21) Appl. No.: 12/441,692

(22) PCT Filed: Sep. 26, 2007

(86) PCT No.: PCT/JP2007/068662
§ 371 (c)(1), (2), (4) Date: Mar. 17, 2009

(87) PCT Pub. No.: WO2008/038656
PCT Pub. Date: Apr. 3, 2008

(65) Prior Publication Data
US 2010/0012243 A1    Jan. 21, 2010

(30) Foreign Application Priority Data
Sep. 26, 2006   (JP) .................................. 2006-260134

(51) Int. Cl.
  *B60C 5/00* (2006.01)
  *B60C 19/00* (2006.01)
(52) U.S. Cl. ....................................... 152/157; 152/450
(58) Field of Classification Search .......... 152/155–159, 152/165; *B60C 5/00*
See application file for complete search history.

(56) References Cited

U.S. PATENT DOCUMENTS

| | | | |
|---|---|---|---|
| 7,387,141 B2 * | 6/2008 | Tanno et al. ................ | 152/155 |
| 7,556,075 B2 | 7/2009 | Tanno | |
| 7,735,532 B2 | 6/2010 | Tanno et al. | |
| 7,854,244 B2 * | 12/2010 | Tanno ........................ | 152/155 |
| 2003/0020320 A1 | 1/2003 | Yukawa et al. | |
| 2003/0188817 A1 | 10/2003 | Yukawa et al. | |
| 2005/0098251 A1 | 5/2005 | Yukawa | |
| 2006/0157180 A1 | 7/2006 | Tanno et al. | |
| 2006/0185777 A1 | 8/2006 | Tanno | |
| 2007/0074798 A1 | 4/2007 | Tanno et al. | |
| 2007/0119532 A1 | 5/2007 | Tanno et al. | |

(Continued)

FOREIGN PATENT DOCUMENTS

| | | |
|---|---|---|
| JP | A 2003-48407 | 2/2003 |
| JP | A 2003-226104 | 8/2003 |

(Continued)

*Primary Examiner* — Justin Fischer
*Assistant Examiner* — Philip N Schwartz
(74) *Attorney, Agent, or Firm* — Greer, Burns & Crain, Ltd.

(57) ABSTRACT

A tire noise reduction device including at least one sound absorbing member of flexible polyurethane foam to be attached to an inner surface of a tire facing a cavity of the tire. The sound absorbing member includes a first sound absorbing layer placed on a tire inner surface side thereof and a second sound absorbing layer placed on a tire reverse inner surface side thereof, with the second sound absorbing layer being disposed on the first sound absorbing layer. The second sound absorbing layer has a density lower than that of the first sound absorbing layer. The second sound absorbing layer is of a thickness that is greater than or equal to that of the first sound absorbing layer. The second sound absorbing layer extends annularly in the tire circumferential direction, while the first sound absorbing layer includes a plurality of the sound absorbing members.

11 Claims, 3 Drawing Sheets

U.S. PATENT DOCUMENTS

| | | |
|---|---|---|
| 2007/0175559 A1 | 8/2007 | Tanno et al. |
| 2007/0199636 A1 | 8/2007 | Tanno |
| 2010/0012244 A1 | 1/2010 | Tanno et al. |

FOREIGN PATENT DOCUMENTS

| | | |
|---|---|---|
| JP | 2005-075206 A | 3/2005 |
| JP | A 2005-138760 | 6/2005 |
| WO | WO 2005/012005 A1 | 2/2005 |
| WO | WO 2005/012008 A1 | 2/2005 |
| WO | WO 2005/058616 A1 | 6/2005 |
| WO | WO 2005/072991 A1 | 8/2005 |
| WO | WO 2005/087515 A1 | 9/2005 |
| WO | WO2005/100051 | 10/2005 |
| WO | WO 2006/088000 A1 | 8/2006 |
| WO | WO2006/088195 * | 8/2006 |
| WO | WO 2007/058311 A1 | 5/2007 |

\* cited by examiner

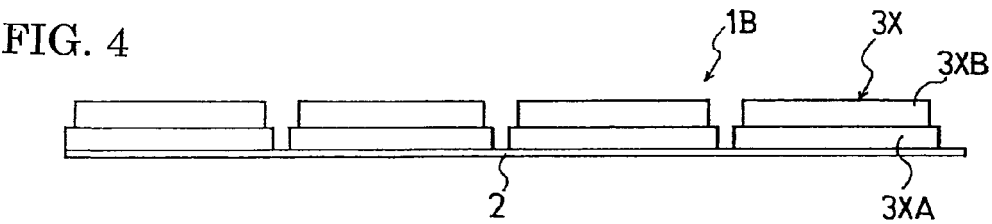
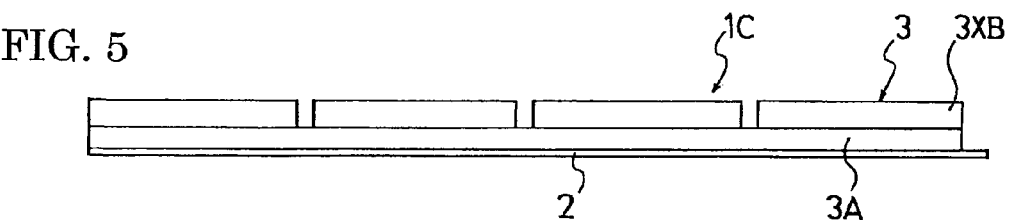
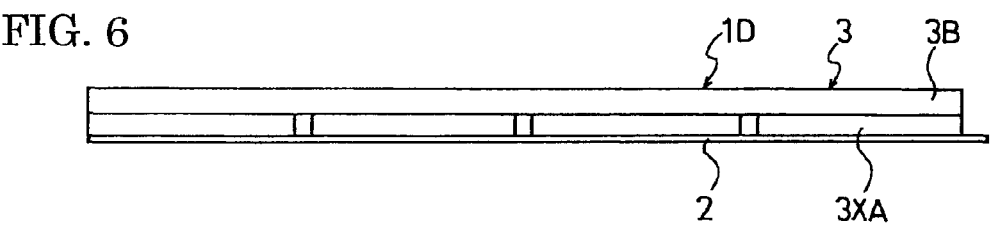
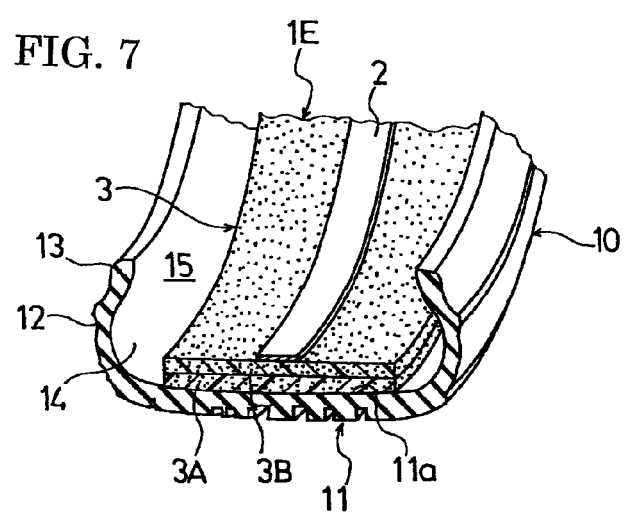

US 8,387,670 B2

TIRE NOISE REDUCTION DEVICE AND PNEUMATIC TIRE

This application is a U.S. National Phase under 35 U.S.C. §371 of International Application No. PCT/JP2007/068662, filed Sep. 26, 2007.

TECHNICAL FIELD

The present invention relates to a tire noise reduction device and a pneumatic tire having the tire noise reduction device, and more particularly to a tire noise reduction device and a pneumatic tire capable of reducing weight while improving durability.

TECHNICAL BACKGROUND

A cavity resonance phenomenon that occurs in an airtightly sealed tire cavity formed between the rim of a wheel and a pneumatic tire mounted on the rim is a major factor of tire noise. Noise around 250 Hz regularly heard during running or impulsive sounds generated in running over joint lines or the like of a road, for example, is involved with the cavity resonance phenomenon.

As a technique for reducing noise caused by such a cavity resonance phenomenon, there is known, for example, a technique such that a sound absorbing member of a porous material such as urethane resin foam is disposed on the inner surface of a tire facing the tire cavity to thereby reduce noise caused by the cavity resonance phenomenon (see a patent document 1, for example). On the other hand, the sound absorbing member has chipping and cracking arising from friction against the inner surface of the tire which is repeatedly deformed during running. Therefore, by increasing the density of the sound absorbing member, the mechanical strength of the sound absorbing member is enhanced to thereby suppress occurrence of chipping and cracking, enhancing durability.

However, mounting of the sound absorbing member with a high density increases tire weight, whereby an increase in unspring mass of the tire creates a problem of degrading ride comfort. Another problem is that it is difficult to obtain sufficient durability which can satisfy high requirements in the case of simply increasing the density of the sound absorbing member.

Patent Document 1: Japanese Patent Application Kokai Publication 2003-226104

DISCLOSURE OF THE INVENTION

Problems to be Solved by the Invention

An object of the present invention is to provide a tire noise reduction device and a pneumatic tire, in which weight can be reduced while sound absorbing characteristics are maintained and durability is improved.

Means for Solving the Problem

A tire noise reduction device according to the present invention for achieving the above object comprises at least one sound absorbing member of flexible polyurethane foam to be attached to an inner surface of a tire facing a cavity of the tire, wherein: the at least one sound absorbing member comprises a first sound absorbing layer placed on a tire inner surface side thereof and a second sound absorbing layer placed on a tire reverse inner surface side thereof, the second sound absorbing layer being disposed on the first sound absorbing layer; the first sound absorbing layer has a tear strength (N/cm) per unit density ($kg/m^3$) which is equal to or more than 0.30; and the second sound absorbing layer has a density which is lower than that of the first sound absorbing layer.

A pneumatic tire according to the present invention has the above tire noise reduction device on an inner surface of the tire facing a cavity of the tire.

Effects of the Invention

According to the present invention mentioned above, the second sound absorbing layer of the sound absorbing member is lower in density than before. Therefore, the mass of the sound absorbing member is reduced, allowing weight lightening to be achieved.

The tear strength (N/cm) per unit density ($kg/m^3$) of the first sound absorbing layer disposed on the tire inner surface side is specified as mentioned above, whereby occurrence of chipping and cracking to the first sound absorbing layer can effectively be suppressed when the first sound absorbing layer comes into contact with and friction against the inner surface of the tire repeatedly deformed during running, enabling durability to be improved.

In addition, it is sufficient to change the density of the second sound absorbing layer of the sound absorbing member, and there is no affect on the entire volume of the sound absorbing member influencing sound absorbing characteristics. Therefore, sound absorbing characteristics can be maintained at the same level as is conventional.

BRIEF DESCRIPTION OF THE DRAWINGS

FIG. 4 is a partial enlarged side view showing still another embodiment of a tire noise reduction device according to the present invention.

FIG. 5 is a partial enlarged side view showing still another embodiment of a tire noise reduction device according to the present invention.

FIG. 6 is a partial enlarged side view showing still another embodiment of a tire noise reduction device according to the present invention.

FIG. 7 is a fragmentary perspective view partially showing still another embodiment of a tire noise reduction device according to the present invention in a state where it has been attached to a tire.

| | |
|---|---|
| 1A-1F | tire noise reduction device |
| 2 | elastic band (elastic ring) |
| 3 | sound absorbing member |
| 3A | first sound absorbing layer |

| | |
|---|---|
| 3B | second sound absorbing layer |
| 3X | sound absorbing member |
| 3XA | first sound absorbing layer |
| 3XB | second sound absorbing layer |
| 10 | pneumatic tire |
| 11 | tread portion |
| 11a | inner surface |
| 14 | tire inner surface |
| 15 | cavity |
| t1, t2, t3 | thickness |

BEST MODES FOR CARRYING OUT THE INVENTION

Embodiments of the present invention will be described in detail below with reference to the attached drawings.

Figure 1:
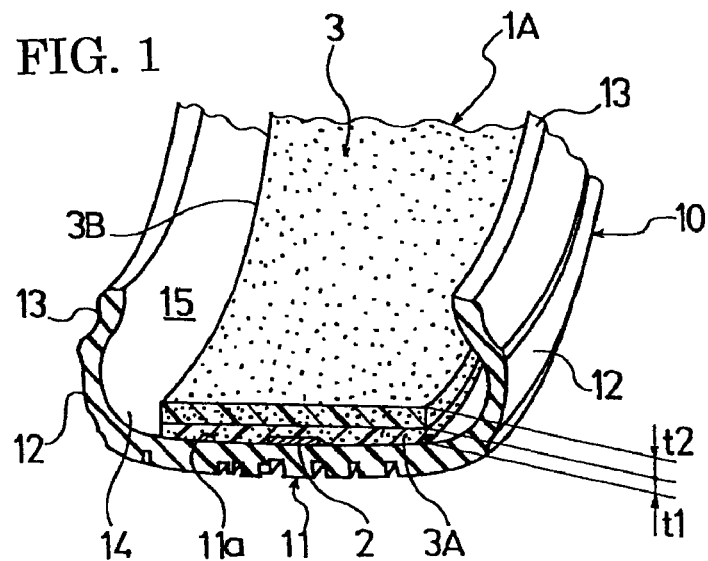
FIG. 1 is a fragmentary perspective view partially showing an embodiment of a tire noise reduction device according to the present invention in a state where it has been attached to a tire.
Figure 2:
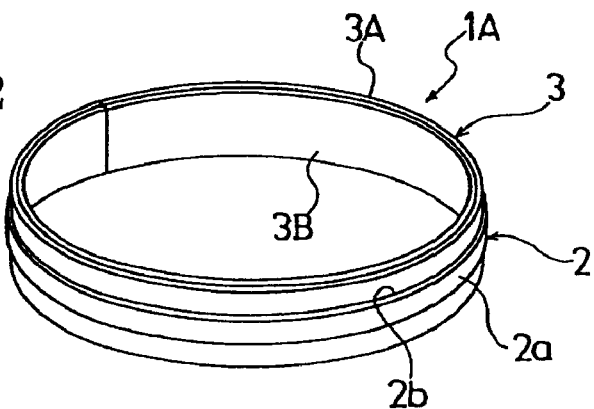
FIG. 2 is a perspective view of the tire noise reduction device of FIG. 1.

Referring to FIGS. 1 and 2, there is shown an embodiment of a tire noise reduction device according to the present invention; reference symbol 1A denotes a tire noise reduction device, and reference numeral 10 denotes a pneumatic tire having the tire noise reduction device 1A.

The pneumatic tire 10 includes a tread portion 11, right and left bead portions 12 and right and left sidewall portions 13 connecting the tread portion 11 to the right and left bead portions 12. The pneumatic tire 10 has a cavity 15 which is a space surrounded by an inner surface 14 of the tire. Although not shown in the drawings, a carcass ply extends between the right and left bead portions 12 inside the tire. A plurality of belt plies are provided radially outwardly of the carcass ply in the tread portion 11. A bead core is embedded in each of the right and left bead portions 12. The carcass ply has opposite ends which are turned up around the bead cores from the inner side toward the outer side in the axial direction of the tire.

The tire noise reduction device 1A is attached to the tire inner surface 14 (inner surface 11a of the tread portion 11) facing the cavity 15 of the pneumatic tire 10. The tire noise reduction device 1A has one sound absorbing member 3 of flexible polyurethane foam for absorbing cavity resonance noise and an annular elastic band 2 for attaching the sound absorbing member 3 to the inner surface 11a of the tread portion 11.

The annular elastic band 2 comprises an elastic ring formed of a belt-shaped elastic body made in the form of a ring. The tire noise reduction device 1A (sound absorbing member 3) is attached to the inner surface 11a of the tread portion 11 with the radially outer surface 2a of the elastic band 2 facing the inner surface 11a of the tread portion 11, using a resilient memory of the elastic band 2. As materials used for the elastic band 2, any materials may be used if they can provide the resilient memory for attachment. Metals such as stainless steel and resins such as nylon resins and polypropylene resins, for example, are preferably used for the materials. The elastic band 2 has the same size as is conventional; its width is preferably in the range of 10 to 30 mm, and its thickness is preferably in the range of 0.5 to 2.0 mm.

The sound absorbing member 3 extends fully around the elastic band 2 alongtherewith, and is fixed with an adhesive agent or the like to the radially inner surface 2b of the elastic band 2. The sound absorbing member 3 comprises a first sound absorbing layer 3A located on the tire inner surface side of the sound absorbing member 3 (elastic band radially inner surface 2b side), and a second sound absorbing layer 3B located on the tire reverse inner surface side of the sound absorbing member 3. Both of the first sound absorbing layer 3A and the second sound absorbing layer 3B are formed of flexible polyurethane foam. The second sound absorbing layer 3B which extends annularly is disposed on the radially inner side of the first sound absorbing layer 3A which extends annularly. The first sound absorbing layer 3A has a density as high as is conventional. The second sound absorbing layer 3B has a density lower than that of the first sound absorbing layer 3A, whereby the weight of the sound absorbing member 3 is reduced.

The first sound absorbing layer 3A has a tear strength (N/cm) per unit density ($kg/m^3$) which is equal to or more than 0.30, thereby effectively suppressing occurrence of chipping and cracking of the first sound absorbing layer 3A arising from friction between the first sound absorbing layer 3A and the inner surface of the tire repeatedly deformed during running. The tear strength (N/cm) per unit density ($kg/m^3$) of the first sound absorbing layer 3A is preferably equal to or more than 0.33, more preferably equal to or more than 0.35, even more preferably equal to or more than 0.39, and most preferably equal to or more than 0.40. The upper limit of the tear strength (N/cm) per unit density ($kg/m^3$) is preferably equal to or less than 0.90 in terms of difficulty of production. The upper limit is more preferably equal to or less than 0.7, and most preferably equal to or less than 0.65.

Note that the tear strength (N/cm) per unit density ($kg/m^3$) referred here is a value obtained by dividing a measured tear strength (N/cm) by a measured unit density ($kg/m^3$). The density is measured in accordance with JIS K7222. The tear strength is measured in accordance with JIS K6400-5 using a test piece having an angle shape and no cut.

The density of the first sound absorbing layer 3A is preferably in the range of 18 $kg/m^3$ to 40 $kg/m^3$. If the density of the first sound absorbing layer 3A is less than 18 $kg/m^3$, reduction of the mechanical strength is incurred. If the density of the first sound absorbing layer 3A is greater than 40 $kg/m^3$, it is not preferable because an excessive weight increase is incurred. Note that the density referred here is also measured in accordance with JIS A7222.

The density of the second sound absorbing layer 3B is preferably in the range of 40% to 80% of the density of the first sound absorbing layer 3A. If the density of the second sound absorbing layer 3B is under 40% of the density of the first sound absorbing layer 3A, mechanical strength is degraded, whereby the second sound absorbing layer 3B is subject to damage due to repeated bending deformation. If the density of the second sound absorbing layer 3B is beyond 80% of the density of the first sound absorbing layer 3A, it is difficult to effectively reduce weight. The second sound absorbing layer 3B with such a density preferably has the same tear strength (N/cm) per unit density ($kg/m^3$) as that of the first sound absorbing layer 3A.

There is no particular limitation to the tear strength (N/cm) of the first sound absorbing layer 3A as far as the above-mentioned tear strength per unit density is achieved. However, the tear strength of the first sound absorbing layer 3A is preferably equal to or more than 3 N/cm in terms of more effectively suppressing occurrence of chipping and cracking of the first sound absorbing layer 3A. The upper limit of the tear strength of the first sound absorbing layer 3A is preferably equal to or less than 28 N/cm, and more preferably equal to or less than 24 N/cm in terms of stamping operability of the sound absorbing layer.

The flexible polyurethane foam used for the first sound absorbing layer 3A and the second sound absorbing layer 3B described above can be obtained by for example, reacting and foaming a raw material composition of polyurethane foam having at least a polyol component, a polyisocyanate component and a foaming agent, and, if necessary additives such as a foam-adjusting agent, a catalyst, a cross-linking agent, an antioxidant, an ultraviolet absorbing agent and a coloring agent according to a known production method such as a one-shot method. Referring to the one-shot method, the polyurethane foam is produced by for example, mixing the components with strong stir as soon as they are added into a mixing chamber.

The density and tear strength of the flexible polyurethane foam is controlled by adjusting the additive amounts and types of the polyol component, polyisocyanate component, foaming agent and foam-adjusting agent, the raw material stirring degree, pressure in the mixing chamber, raw material supply tank and pipe fitting, etc.

Flexible polyurethane foams are classified broadly into a polyester urethane foam, a polyether urethane foam and a polyester ether urethane foam according to the type of the polyol component that is a main raw material. A polyester urethane foam is preferably used for the flexible polyurethane foam of the first sound absorbing layer 3A having the above density and tear strength. A polyether urethane foam is preferably used for the flexible polyurethane foam of the second sound absorbing layer 3B having the above density The polyol component used for production of the flexible polyurethane foam is one having two or more hydroxyls in one molecule; any one may be used if it is one conventionally used for production of polyurethane foam. As such a polyol component, polyester polyol for the polyester urethane foam and polyether polyol for the polyether urethane foam are preferably exemplified.

The polyester polyol is one obtained by polycondensing polycarboxylic acid and a compound having two or more hydroxyls in one molecule. As the polycarboxylic acid, a compound having two or more carboxyl groups in one molecule is used; specifically adipic acid, maleic acid, succinic acid, malonic acid, phthalic acid or the like, for example, can be used. As the compound having two or more hydroxyls in one molecule, a compound having two or more active hydrogen atoms in one molecule can be used. As the compound having two or more active hydrogen atoms in one molecule, ethylene glycol, propylene glycol, glycerin, trimethylolpropane, triethanolamine, pentaerythritol, sorbitol or sucrose, for example, can be mentioned. The polycarboxylic acid and the compound having two or more hydroxyls in one molecule may each include one type or more. The polyester polyol can be produced according to a known method.

As the polyether polyol, one obtained by polymerizing a mixture of the above compound having two or more active hydrogen atoms in one molecule as an initiator and alkylene oxide added thereto can be used. As the alkylene oxide, ethylene oxide or propylene oxide, for example, can be mentioned. The compound having two or more active hydrogen atoms in one molecule and the alkylene may each also include one type or more. Polyether polyol belonging to a glycerin system is preferably used for the polyether polyol. In particular, one obtained by polymerizing a mixture of glycerin as an initiator and propylene oxide added thereto is preferably used.

There is no particular limitation to the polyisocyanate component if it is a compound having two or more isocyanate groups in one molecule. For example, polyisocyanate belonging to an aliphatic system, aromatic system or the like alone or a mixture of two or more types thereof can be used. As the polyisocyanate belonging to the aliphatic system, hexamethylene diisocyanate or isophorone diisocyanate, for example, can be mentioned. As the polyisocyanate belonging to the aromatic system, 2,4-tolylenediisocyanate, 2,6-tolylenediisocyanate, a mixture of 2,4-tolylenediisocyanate and 2,6-tolylenediisocyanate, diphenylmethane diisocyanate or polymethylene polyphenyl diisocyanate, for example, can be mentioned. Preferably used one is generally the mixture of 2,4-tolylenediisocyanate and 2,6-tolylenediisocyanate or diphenylmethane diisocyanate.

As the foaming agent, one conventionally used as a foaming agent in the field of polyurethane can be employed. Preferably, one consisting of water is used in terms of circumstances. Water reacts with polyisocyanate to generate carbon dioxide, and is, therefore, used as a chemical foaming agent. The amount of the foaming agent generally used is preferably 1 to 7 parts by mass per 100 parts by mass of the polyol component, and is preferably 2 to 6 parts by mass in terms of obtaining the density of the present invention. A physical foaming agent may be properly used as the foaming agent. Methylene chloride, chlorofluorocarbon types, hydroxychlorofluorocarbon types, hydrocarbon types (cyclopentane and the like), carbon dioxide, liquefied carbon dioxide or other foaming agent is mentioned as the physical foaming agent and is used as a foaming assistant with water. The amount of the physical foaming agent is preferably equal to or less than 20 parts by mass per 100 parts by mass of the polyol component in terms of stability of foaming, and is preferably equal to or less than 10 parts by mass in terms of the tear strength.

As the catalyst and the foam-adjusting agent, ones generally used in the production of flexible polyurethane foam can be used, and the additive amounts thereof are sufficient if they are also amounts normally employed in the production of flexible polyurethane foam.

Referring to the thicknesses of the first sound absorbing layer 3A and second sound absorbing layer 3B of the above flexible polyurethane foam, the thickness T1 of the first sound absorbing layer 3A is preferably in the range of 5 mm to 15 mm, and the thickness T2 of the second sound absorbing layer 3B is preferably in the range of 4 mm to 30 mm. If the thickness t1 of the first sound absorbing layer 3A is less than 5 mm, it is difficult to provide a sound absorbing effect as a sound absorbing element placed between the second sound absorbing layer 3B and the tire inner surface. If the thickness t1 of the first sound absorbing layer 3A is greater than 15 mm, chipping and cracking to the first sound absorbing layer 3A are apt to occur because of an increase in surface stress when bending formation is applied. If the thickness t2 of the second sound absorbing layer 3B is less than 4 mm, it is difficult to show effective sound absorbing characteristics as a sound absorbing element. If the thickness t2 of the second sound absorbing layer 3B is greater than 30 mm, chipping and cracking to the second sound absorbing layer 3B are apt to occur like the first sound absorbing layer 3A.

The width of the sound absorbing member 3 can be 40% to 90% of a cross-sectional width of the tire; the width may be constant or varied.

According to the present invention described above, since the second sound absorbing layer 3B of the sound absorbing member 3 is lower in density than before, the weight of the sound absorbing member 3 can be reduced. On the other hand, since the tear strength (N/cm) per unit density ($kg/m^3$) of the first sound absorbing layer 3A disposed on the tire inner surface side is specified as mentioned above, it is effectively suppressed to produce chipping and cracking to the first sound absorbing layer 3A when the first sound absorbing layer 3A comes into contact with and friction against the inner surface of the tire repeatedly deformed during running, allowing durability to be improved.

In addition, the density of the second sound absorbing layer 3B of the sound absorbing member 3 is just changed, and there is no need to change the volume of the sound absorbing member 3 affecting sound absorbing characteristics. Therefore, sound absorbing characteristics can be maintained at the same level as is conventional.

Figure 3:
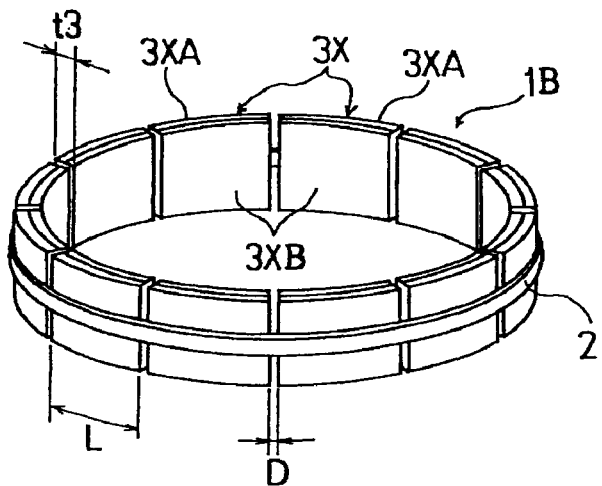
FIG. 3 is a perspective view showing another embodiment of a tire noise reduction device according to the present invention.

Referring to FIG. 3, there is shown another embodiment of a tire noise reduction device according to the present invention. The tire noise reduction device 1B of FIG. 3 has a plurality of sound absorbing members 3X instead of the one annularly extending sound absorbing member 3 described above. The plurality of sound absorbing members 3X are fixed with an adhesive agent or the like to the radially inner surface 2b of the elastic band 2 at prescribed intervals D in the circumferential direction of the elastic band 2. When the tire noise reduction device 1B has been attached to the pneumatic tire 10, the plurality of sound absorbing members 3X are annularly placed at prescribed intervals in the circumferential direction of the tire.

Each sound absorbing member 3X comprises a first sound absorbing layer 3XA located on the tire inner surface side and a second sound absorbing layer 3XB located on the tire reverse inner surface side like the above-described sound absorbing member 3. The second sound absorbing layer 3XB is disposed on the inner side of the first sound absorbing layer 3XA. The first sound absorbing layer 3XA and the second sound absorbing layer 3XB have the same structures as the first sound absorbing layer 3A and the second sound absorbing layer 3B described above, respectively. The tire noise reduction device 1B comprising such a plurality of sound absorbing members 3X can also obtain the same effects as the above.

The total length of the plurality of sound absorbing members 3X in the circumferential direction of the tire is preferably equal to or more than 75% of an inner peripheral length of the tire, whereby the plurality of sound absorbing members 3X can show good sound absorbing characteristics.

The number of the sound absorbing members 3X is preferably in the range of 5 to 50. By making the number of the sound absorbing members 3X five or more, a weight balance of the sound absorbing members 3X is maintained evenly around the circumference of the tire, and occurrence of tire vibration during running at a high speed can be suppressed. The reason why the number of the sound absorbing members 3X is fifty or less is prevention of being subject to damage; if the sound absorbing members 3X are too short in length in the circumferential direction of the tire, bending stiffness in the width direction of the tire is excessively reduced, and the sound absorbing members 3X are subject to damage.

An interval D between each pair of adjacent sound absorbing members 3X and 3X is preferably equal to or more than one time the thickness t3 of ends of the sound absorbing members 3X and equal to or less than 15% of the inner peripheral length of the tire. If the interval D is less than the thickness t3 of the ends of the sound absorbing members 3X, the adjacent sound absorbing members 3X and 3X are subject to interference with each other when the tire rotating is repeatedly deformed. If the interval D is greater than 15% of the inner peripheral length of the tire, a weight balance of the sound absorbing members 3X around the circumference of the tire is disrupted and tire vibration during running at a high speed is apt to occur. The interval D is more preferably equal to or less than 10% of the inner peripheral length of the tire.

Note that the inner peripheral length of the tire referred in the present invention is a peripheral length of the inner peripheral surface of the tire at an equatorial position thereof in a state where the tire is mounted on a rim and inflated to an air pressure corresponding to the maximum load capability specified by JATMA.

The sound absorbing members 3X each preferably have a length L, in the longitudinal direction thereof, of 2% to 15% of the inner peripheral length of the tire. The length L of each sound absorbing member 3X is preferably equal, but may be different. If the length L of the sound absorbing member 3X is under 2% of the inner peripheral length of the tire, bending stiffness in the width direction of the tire is excessively reduced, and the sound absorbing member 3X is subject to damage. If the length L of the sound absorbing member 3X is beyond 15%, the sound absorbing member 3X excessively deforms in the radial direction of the tire when the tire rotating is repeatedly deformed, and the sound absorbing member 3X is subject to damage.

The first sound absorbing layer 3XA of the sound absorbing member 3X is as equal in length as the second sound absorbing layer 3XB thereof in the circumferential direction in FIG. 3. However, the first sound absorbing layer 3XA may be different in length from the second sound absorbing layer 3XB as shown in FIG. 4. In this case, the interval D is one between adjacent first sound absorbing layers 3XA.

Referring to FIGS. 5 and 6, there are respectively shown still other embodiments of a tire noise reduction device according to the present invention, and each tire noise reduction device is configured so as to combine parts of components of the tire noise reduction devices of FIGS. 3 and 4. More specifically the tire noise reduction device 1C of FIG. 5 has a sound absorbing member 3 comprising a first sound absorbing layer 3A in FIG. 2 and second sound absorbing layers 3XB in FIG. 3. The tire noise reduction device 1D of FIG. 6 has a sound absorbing member 3 comprising first sound absorbing layers 3XA in FIG. 3 and a second sound absorbing layer 3B in FIG. 2. When the above-described tire noise reduction device 1C, 1D has been mounted on the tire inner surface 14 (inner surface 11a of the tread portion 11) facing the tire cavity 15, the same effects as the above can also be obtained.

Referring to FIG. 7, there is shown still another embodiment of a tire noise reduction device according to the present invention. The tire noise reduction device 1E of FIG. 7 is configured so as to fix the above-described sound absorbing member 3 to the radially outer side of the elastic band 2. In the alternative of the sound absorbing member 3, the sound absorbing members 3X shown in FIG. 3 or the sound absorbing member 3 shown in FIGS. 4, 5 may be used for the tire noise reduction device 1E. When the above-described tire noise reduction device 1E has been mounted on the tire inner surface 14 (inner surface 11a of the tread portion 11) facing the tire cavity 15, the same effects as the above can also be provided.

Figure 8:
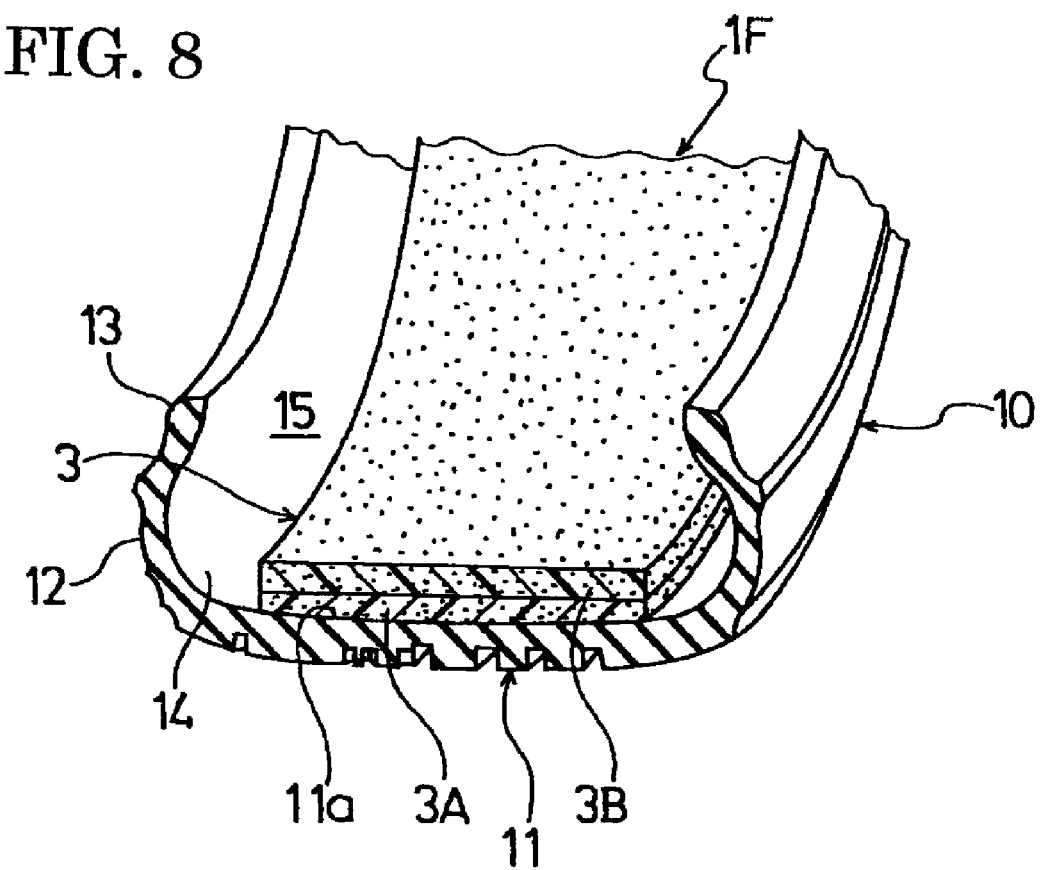
FIG. 8 is a fragmentary perspective view partially showing still another embodiment of a tire noise reduction device according to the present invention in a state where it has been attached to a tire.

Referring to FIG. 8, there is shown still another embodiment of a tire noise reduction device according to the present invention. The tire noise reduction device 1F of FIG. 8 does not have the above-described elastic band 2 but has only the sound absorbing member 3 shown in FIG. 2. The sound absorbing member 3 is mounted on the pneumatic tire 10 by directly sticking the sound absorbing member 3 with an adhesive agent on the tire inner surface 14 (inner surface 11a of the tread portion 11) facing the tire cavity 15. In the alternative of the sound absorbing member 3 of FIG. 2, the sound absorbing members 3X shown in FIG. 3 or the sound absorbing member 3 shown in FIGS. 4, 5 may be used for the tire noise reduction device 1F. The tire noise reduction device 1F structured as described above can also provide the same effects as the above.

EXAMPLE

Prepared respectively were tire noise reduction devices according to the tire noise reduction devices of the present invention (present examples 1 and 2), conventional tire noise reduction device (conventional example) and comparative tire noise reduction device (comparative example), the tire noise reduction devices of the present invention (present example 1 and 2) each having a sound absorbing member of flexible polyurethane foam with a thickness of 15 mm and with a width of 150 mm comprising a first sound absorbing layer and a second sound absorbing layer and having a structure shown in FIG. 2 in which the thickness, density, tear strength and tear strength/density of each of the first sound absorbing layer and second sound absorbing layer were as shown in Table 1, the conventional tire noise reduction device having the same structure as the tire noise reduction device of the present invention (present example 1) except that the sound absorbing member consisted of a first sound absorbing layer and the thickness, density, tear strength and tear strength/density of the first sound absorbing layer were as shown in Table 1, the comparative tire noise reduction device having the same structure as the tire noise reduction device of the present invention (present example 1) except that the sound absorbing member consisted of a second sound absorbing layer and the thickness, density, tear strength and tear strength/density of the second sound absorbing layer were as shown in Table 1.

The tire noise reduction devices were each attached to the inner surface of the tread portion of a pneumatic tire having a tire size of 215/55R16, and the pneumatic tire was then assembled to a standard rim. Evaluation testing for ride comfort, noise reduction capability and durability was carried out according to the following test methods, obtaining the results shown in Table 1. The mass of the sound absorbing member of each tire noise reduction device was also measured during production of the tire noise reduction device, obtaining the result shown in Table 1.

Ride Comfort

The rim-assembled pneumatic tires were inflated to an air pressure of 210 kPa, and mounted on a passenger car of 2500 cc displacement. A feeling evaluation test for ride comfort was carried out by three test drivers during running of the passenger car on a test course. Five-grade evaluation was made for the test result by each of the three test drivers. The mean value of the test results of the three test drivers is represented in Table 1. As the value is higher, ride comfort is better.

Noise Reduction Capability

The rim-assembled pneumatic tires were mounted on a passenger car of 2500 cc displacement as in the above. The peak level of cavity resonance noise created inside the passenger car was measured when the car was run straight at a speed of 60 km/h on a test course. The measurement result is represented where the pneumatic tire having the conventional tire noise reduction device is a reference. As the value of minus is greater, noise is lower, meaning that noise reduction capability is better.

Durability

The rim-assembled pneumatic tires were inflated to an air pressure of 210 kPa, mounted on a drum testing machine, and run for 80 hours under conditions of a load of 8.1 N, an ambient temperature of 38±3 degrees C., and a speed of 81 km/h. Thereafter, the tire noise reduction devices were each detached from the tire, and a state of damage (chipping and cracking) to the sound absorbing member of each tire noise reduction device was visually observed and evaluated. The evaluation result is represented by four levels of A1, A2, A3 and A4. A1 means that damage does not occur at all. A2 means that occurrence of damage is slightly observed, the maximum length of a chipping part is less than 10 mm, the maximum depth of a cracking part is less than 5 mm and there is no problem in practical use. A3 means that occurrence of damage is observed, the maximum length of a chipping part is equal to or greater than 10 mm and is less than 30 mm, the maximum depth of a cracking part is equal to or greater than 5 mm and is less than 10 mm and there is a problem in practical use. A4 means that occurrence of remarkable damage is observed, the maximum length of a chipping part is equal to or greater than 30 mm, the maximum depth of a cracking part is equal to or greater than 10 mm and there is a big problem in practical use.

TABLE 1

| | Conventional Example | Comparative Example | Present Example 1 | Present Example 2 |
|---|---|---|---|---|
| First Sound Absorbing Layer | | | | |
| Thickness (mm) | 15 | — | 7.5 | 7.5 |
| Density (kg/m$^3$) | 28 | — | 28 | 29 |
| Tear Strength (N/cm) | 8 | — | 11 | 12 |
| Tear Strength/Density | 0.29 | — | 0.39 | 0.41 |
| Second Sound Absorbing Layer | | | | |
| Thickness (mm) | — | 15 | 7.5 | 7.5 |
| Density (kg/m$^3$) | — | 18 | 18 | 18 |
| Tear Strength (N/cm) | — | 4 | 4 | 4 |
| Tear Strength/Density | — | 0.22 | 0.22 | 0.22 |
| Mass (g) | 100 | 64 | 82 | 84 |
| Ride Comfort | 3 | 4 | 4 | 4 |
| Noise Reduction Capacity | reference | ±0 dB | ±0 dB | ±0 dB |
| Durability | A3 | A4 | A2 | A1 |

From Table 1, it is understood that the tire noise reduction devices of the present invention can enhance durability while maintaining sound absorbing characteristics at the same level as those of the conventional tire noise reduction device, and can improve ride comfort with reduction in weight.

INDUSTRIAL APPLICABILITY

The present invention having the aforementioned excellent effects is applicable to tire noise reduction devices for reducing noise arising from a cavity resonance phenomenon of a pneumatic tire.

What is claimed is:

1. A tire noise reduction device comprising at least one sound absorbing member of flexible polyurethane foam to be attached to an inner surface of a tire facing a cavity of the tire, wherein:
    the at least one sound absorbing member comprises a first sound absorbing layer placed on a tire inner surface side thereof and a second sound absorbing layer placed on a tire reverse inner surface side thereof, the second sound absorbing layer being disposed on the first sound absorbing layer;
    the first sound absorbing layer has a tear strength (N/cm) per unit density (kg/m$^3$) which is equal to or more than 0.30;
    the second sound absorbing layer has a density which is lower than that of the first sound absorbing layer;
    the first sound absorbing layer has a density of 18 kg/m$^3$ to 40 kg/m$^3$, and wherein the density of the second absorbing layer is 40% to 80% of that of the first sound absorbing layer;

the second sound absorbing layer is of a thickness that is greater than or equal to that of the first sound absorbing layer, one of either the first sound absorbing layer or the second sound absorbing layer is formed of one sound absorbing member extending annularly in the tire circumferential direction and the other of the first or second sound absorbing layers is formed of a plurality of the sound absorbing members annularly disposed at prescribed intervals in the tire circumferential direction, with each of said plurality of sound absorbing members being separated from each other by a gap that extends the full width of the relevant sound absorbing layer, and said second sound absorbing layer extends annularly in the tire circumferential direction.

2. A tire noise reduction device according to claim 1, wherein the tear strength per unit density of the first sound absorbing layer is equal to or less than 0.90.

3. A tire noise reduction device according to claim 2, wherein the tear strength per unit density of the first sound absorbing layer is 0.40 to 0.65.

4. A tire noise reduction device according to claim 1, wherein the first sound absorbing layer has a tear strength of 3 N/cm to 28 N/cm.

5. A tire noise reduction device according to claim 1, wherein the first sound absorbing layer has a thickness of 5 mm to 15 mm, and wherein the second sound absorbing layer has a thickness of 15 mm to 30 mm.

6. A tire noise reduction device according to claim 1, wherein a total length of the plurality of sound absorbing members in the circumferential direction of the tire is equal to or more than 75% of an inner peripheral length of the tire.

7. A tire noise reduction device according to claim 6, wherein the intervals of the plurality of sound absorbing members are equal to or more than the thicknesses of ends of the sound absorbing members and equal to or less than 15% of the inner peripheral length of the tire.

8. A tire noise reduction device according to claim 6, wherein the number of the plurality of sound absorbing members is 5 to 50.

9. A tire noise reduction device according to claim 1, wherein the at least one sound absorbing member is structured so as to be directly stuck on the inner surface of the tire.

10. A tire noise reduction device according to claim 1, further comprising an elastic ring for attaching the at least one sound absorbing member to the inner surface of the tire, the at least one sound absorbing member being fixed to the elastic ring.

11. A pneumatic tire comprising:

an inner surface of the tire facing a cavity of the tire;

at least one sound absorbing member of flexible polyurethane foam attached to the inner surface of the tire facing the cavity of the tire, wherein:

the at least one sound absorbing member comprises a first sound absorbing layer placed on a tire inner surface side thereof and a second sound absorbing layer placed on a tire reverse inner surface side thereof, the second sound absorbing layer being disposed on the first sound absorbing layer;

the first sound absorbing layer has a tear strength (N/cm) per unit density ($kg/m^3$) which is equal to or more than 0.30;

the second sound absorbing layer has a density which is lower than that of the first sound absorbing layer;

the first sound absorbing layer has a density of 18 $kg/m^3$ to 40 $kg/m^3$, and wherein the density of the second absorbing layer is 40% to 80% of that of the first sound absorbing layer;

the second sound absorbing layer is of a thickness that is greater than or equal to that of the first sound absorbing layer, and one of either the first sound absorbing layer or the second sound absorbing layer is formed of one sound absorbing member extending annularly in the tire circumferential direction and the other of the first or second sound absorbing layers is formed of a plurality of the sound absorbing members annularly disposed at prescribed intervals in the tire circumferential direction, with each of said plurality of sound absorbing members being separated from each other by a gap that extends the full width of the relevant sound absorbing layer, wherein said second sound absorbing layer extends annularly in the tire circumferential direction.

\* \* \* \* \*